United States Patent
Dhanda et al.

(10) Patent No.: US 9,286,926 B1
(45) Date of Patent: Mar. 15, 2016

(54) TWO-DIMENSIONAL MAGNETIC RECORDING (TDMR) DISK DRIVE WITH VARYING SERVO TRACK PITCH

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US); Gary Allan Herbst, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/834,683

(22) Filed: Aug. 25, 2015

(51) Int. Cl.
*G11B 21/02* (2006.01)
*G11B 5/596* (2006.01)

(52) U.S. Cl.
CPC ........ *G11B 5/59627* (2013.01); *G11B 5/59688* (2013.01)

(58) Field of Classification Search
CPC .... G11B 5/6005; G11B 5/59633; G11B 5/54; G11B 2005/0021; G11B 5/314; G11B 5/5547; G11B 5/5521; G11B 5/012; G11B 5/00
USPC ........................ 360/78.05, 75, 76, 55, 319, 59
See application file for complete search history.

(56) References Cited

U.S. PATENT DOCUMENTS

| | | | |
|---|---|---|---|
| 5,930,069 | A | 7/1999 | Kim |
| 5,999,351 | A | 12/1999 | Albrecht et al. |
| 6,005,737 | A | 12/1999 | Connolly et al. |
| 6,476,995 | B1 | 11/2002 | Liu et al. |
| 7,268,962 | B2 | 9/2007 | Sado |
| 7,345,842 | B2 | 3/2008 | Chang et al. |
| 8,054,576 | B2 | 11/2011 | Bui et al. |
| 8,873,204 | B1 | 10/2014 | Gao et al. |
| 8,902,528 | B1 * | 12/2014 | Biskeborn ............. G11B 5/588 360/48 |
| 8,902,536 | B1 | 12/2014 | Hwang et al. |
| 2013/0286502 | A1 | 10/2013 | Erden et al. |

\* cited by examiner

*Primary Examiner* — Nabil Hindi
(74) *Attorney, Agent, or Firm* — Thomas R. Berthold

(57) ABSTRACT

A two-dimensional magnetic recording (TDMR) disk drive has a disk with servo tracks with a track pitch that varies across the radius of the disk. The servo track pitch (STP) is related to the cross-track spacing (CTS) of the multiple read sensors in the TDMR head structure. The CTS is given by the equation: $CTS=(CTO)\cos\theta+(ATO)\sin\theta$, where $\theta$ is the skew angle, and CTO is the cross-track spacing and ATO the along-the-track spacing of the read sensors at zero skew angle. The optimal variable STP profile results in track misregistration reduction because it allows each read sensor to read a different servo half-track and thus noise sources not correlated to noise sources read by the other read sensors. The servo tracks may be arranged into a plurality of annular bands, with the STP in each band being fixed and different from the STP in the other bands.

15 Claims, 11 Drawing Sheets

TWO-DIMENSIONAL MAGNETIC RECORDING (TDMR) DISK DRIVE WITH VARYING SERVO TRACK PITCH

BACKGROUND OF THE INVENTION

1. Field of the Invention

This invention relates generally to magnetic recording hard disk drives (HDDs), and more particularly to a two-dimensional magnetic recording (TDMR) HDD.

2. Description of the Related Art

HDDs typically have disks with data tracks with a fixed track spacing or pitch that is set during manufacturing and cannot be changed during the life of the HDD. The positioning of the read/write heads to the data tracks is accomplished by servo tracks that have angularly-spaced servo sectors that contain head positioning information. The servo sectors extend radially across the data tracks. The read head detects the positioning information as the disk rotates and passes the position information to a servo control system to maintain the head on the desired data track. The servo tracks also have a fixed track pitch that is set during manufacturing and that may be different from the fixed track pitch of the data tracks.

A proposed HDD technology that uses multiple read heads or sensors is two-dimensional magnetic recording (TDMR). In TDMR, multiple sensors that are located on a single head structure access the same or adjacent data tracks to obtain signals that are processed jointly. This allows the data tracks to be placed closer together, resulting in an increase in areal data bit density. A head structure with multiple stacked read sensors for TDMR is described in US 2013/0286502 A1 and in U.S. Pat. No. 8,873,204 B1 which is assigned to the same assignee as this application.

It is important in TDMR that the read heads accurately follow the servo tracks to avoid track misregistration (TMR) during reading and writing. A reduction in TMR in a TDMR disk drive depends on the number of servo half-tracks that are being read by the multiple sensors during reading and writing. The servo tracks are written in half-track increments in the disk drive or by a dedicated servowriter during disk drive manufacturing. However, during the servowriting process, media noise, write head motion and mechanical disturbances cause a written-in track shape error for each half-track. However, if all of the sensors are reading different servo half-tracks the noise from multiple servo half-tracks can be averaged out and TMR will be reduced. The number of servo half-tracks that can be followed in a multiple read head structure is a function of the servo track pitch and the cross-track sensor-to-sensor spacing (CTS), which in turn is a function of a factor referred to as head "skew".

Skew arises because the sensors are supported on a radial actuator that causes the sensors to make an arcuate path across the disk. At the mid-diameter (MD) regions of the disk the skew angle θ (the angle between a line orthogonal to the sensor and the servo track) is near zero. However, at the ID and OD regions the skew angle can be up to 15-20 degrees, depending on the geometry of the actuator and disk. As the skew angle increases the CTS of the multiple sensors also increases.

What is needed is a TDMR HDD that compensates for head skew and thus allows the multiple read heads to follow multiple servo half-tracks so as to reduce TMR.

SUMMARY OF THE INVENTION

Embodiments of the invention relate to a two-dimensional magnetic recording (TDMR) disk drive that has a disk with servo tracks that have a track pitch that varies across the radius of the disk. The servo track pitch (STP) is related to the cross-track spacing (CTS) of the multiple read sensors in the TDMR head structure. The CTS is given by the equation: CTS=(CTO)cos θ+(ATO)sin θ, where θ is the skew angle, and CTO is the cross-track spacing and ATO the along-the-track spacing of the read sensors at zero skew angle. Because the skew angle varies with radial position of the TDMR head structure, the optimal variable STP profile across the disk is related to the radial position of the head structure. The optimal variable STP profile results in TMR reduction because it allows each read sensor to read a different servo half-track and thus noise sources not correlated to noise sources read by the other read sensors. This allows for an averaging effect of the multiple read sensors. Since the noise sources are located at the servo half-track edges, if the STP is varied so that the sensors are located at the middle of the servo half-tracks, the maximum TMR reduction will be obtained. The TMR is also related to other non-geometric factors, such as magnetic noise, erase band noise and the servo position error signal (PES) linearity. The variable STP profile based on the CTS may be adjusted based on these other factors. In one implementation of an embodiment of the invention, the servo tracks are arranged into a plurality of annular bands, and the STP in each band is fixed and different from the STP in the other bands.

For a fuller understanding of the nature and advantages of the present invention, reference should be made to the following detailed description taken together with the accompanying figures.

DETAILED DESCRIPTION OF THE INVENTION

Figure 1:
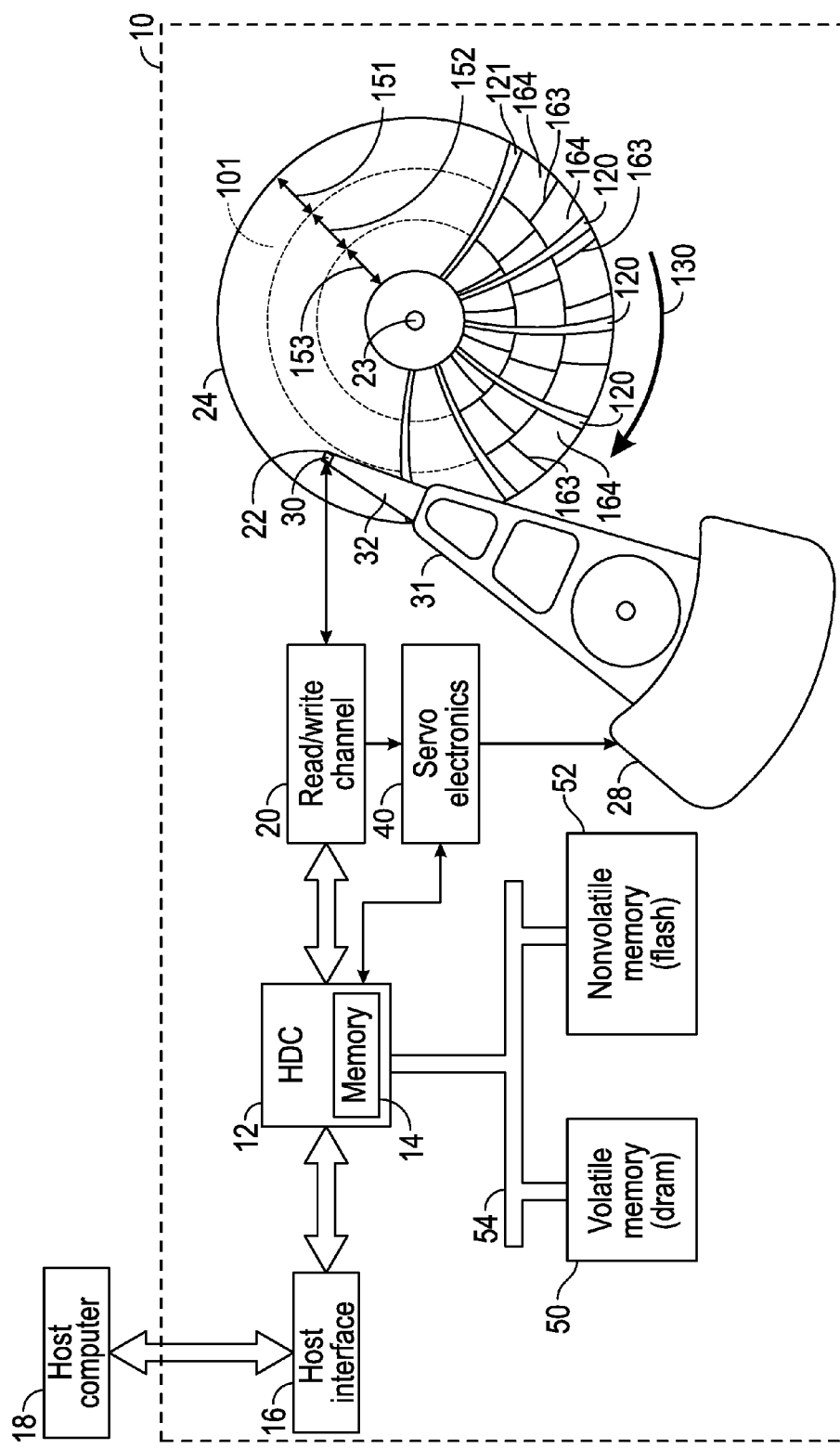
FIG. 1 is a block diagram of a magnetic recording hard disk drive (HDD) according to the prior art that is capable of functioning as a two-dimensional magnetic recording (TMDR) HDD.

FIG. 1 is a block diagram of a prior art magnetic recording disk drive (HDD) 10 that can function as a two-dimensional magnetic recording (TDMR) HDD. The HDD 10 includes a hard disk controller (HDC) 12 that can include and/or be implemented by a microcontroller or microprocessor. The controller 12 runs a computer program that is stored in semiconductor memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SAS (Serial Attached SCSI).

While the top view of FIG. 1 shows only a single disk 24 and associated read/write head 22, the HDD 10 typically includes a stack of disks that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary voce coil motor (VCM) actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has a magnetic recording layer that includes radially-spaced concentric data tracks with a fixed track spacing or track pitch (TP). The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone 151. Each data sector 164 is preceded by a synchronization (sync) field, such as typical sync fields 163. The sync fields 163 are detectable by the read head for enabling synchronization of reading and writing in the data sectors 164.

The disk also includes radially-spaced concentric servo tracks that have a fixed track spacing or pitch (STP) that is typically different from the track pitch of the data tracks. Because the data TP and STP are different, there is not a one-to-one relationship of data tracks to servo tracks, so the radial position of each data track is identified by its nearest servo track plus an offset from that servo track. The servo tracks are not continuous but are formed as a group of angularly-spaced servo sectors 120. The servo sectors 120 contain position error signal (PES) information detectable by the read head for moving the head 22 to desired data tracks and maintaining the head 22 on the data tracks. The servo sectors in each servo track are aligned circumferentially with the servo sectors in the other servo tracks so that they extend across the servo tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. Each of the servo sectors 120 in a servo track typically contains a servo timing mark (STM) that indicates the start of the servo sector, a servo track identification (TID) code, and a portion of a pattern of magnetized blocks or high-frequency bursts that form head position error signal (PES) fields. The PES fields are detected by the read head and decoded to provide a PES, which is a measure of how far the head is off track from the data track centerline. Typically there are multiple data sectors 164 located between the servo sectors 120.

Referring again to FIG. 1, the electronics associated with HDD 10 also includes servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the PES information from the servo sectors 120 to run a servo control loop that produces a control signal representative of head radial position. The control signal is converted to a current that drives actuator 28 to position the head 22.

In the operation of HDD 10, interface 16 receives a request from the host computer 18 for reading from or writing to the data sectors 164. Controller 12 receives a list of requested data sectors from interface 16 and converts them into a set of numbers that uniquely identify the disk surface, data track and data sector. The data track number is used to extract from a table the number of the servo track closest to the desired data track and the amount of radial offset of the data track from that servo track. The numbers are passed to servo electronics 40 to enable positioning head 22 to the appropriate data sector 164. The servo control system enables the head used for reading and writing to be spatially aligned within a fraction of a track-pitch in the radial direction of the disk.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate.

HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

The HDD 10 may also be a HDD that uses "shingle writing", also called "shingled recording" or "shingled magnetic recording" (SMR). SMR HDDs are well-known, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

Figure 2:
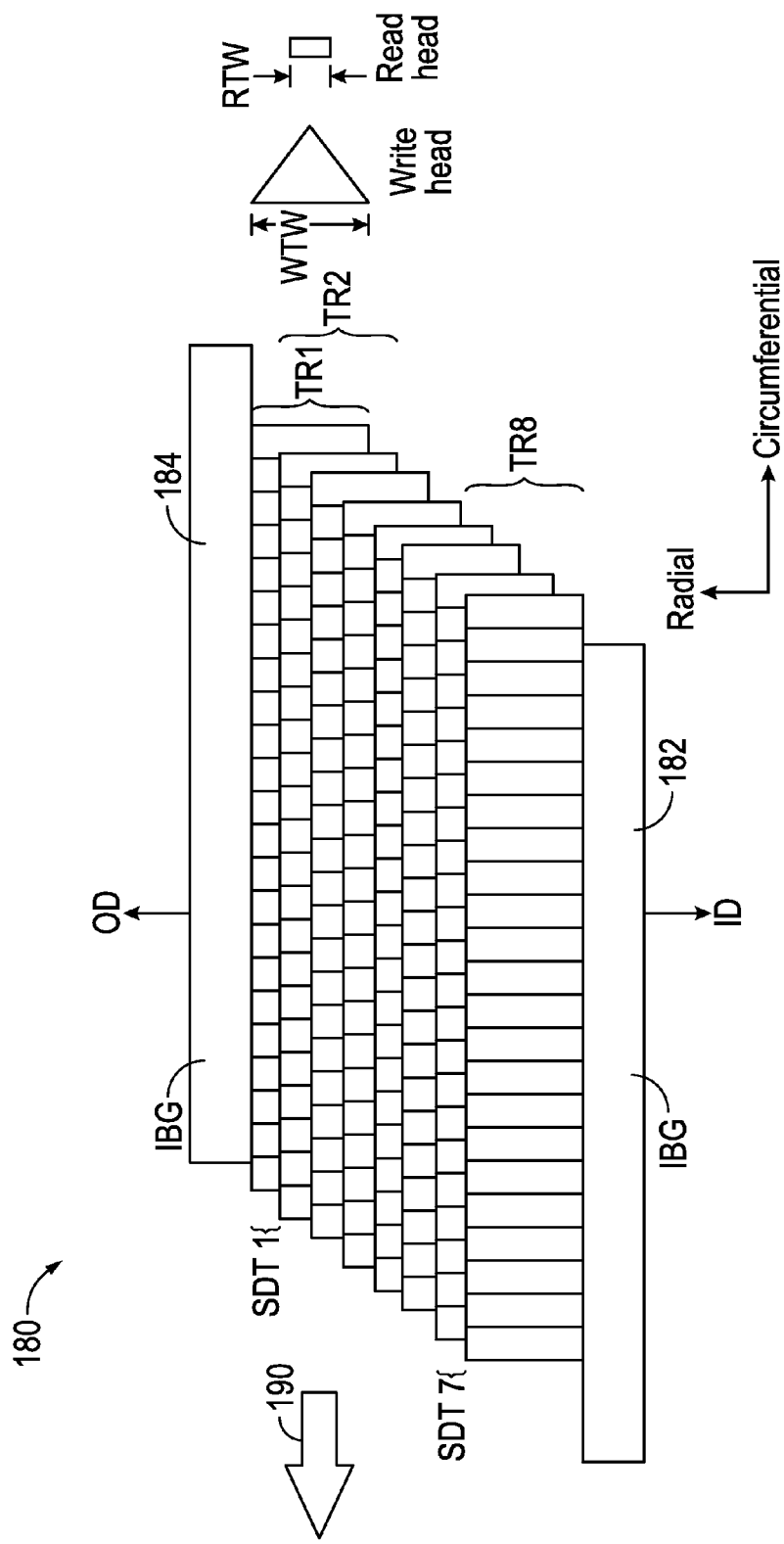
FIG. 2 is a schematic of a shingled region or band of a disk for describing the method of operation of a shingled magnetic recording (SMR) HDD according to the prior art.

FIG. 2 is a schematic of a shingled region or band 180 for use in describing the method of SMR. A typical band will have a large number, i.e., several hundred or thousand, shingled data tracks (SDTs); however only 7 are shown in band 180 for ease of illustration. Band 180 has inter-band gaps (IBGs) 182, 184 that separate it from radially adjacent bands. The write head makes successive paths or tracks (TRs) to form the SDTs which, in the example of FIG. 2, are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 190. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions. SMR HDDs also have servo tracks with servo sectors, and data tracks with a TP different from the STP of the servo tracks.

Figure 3:
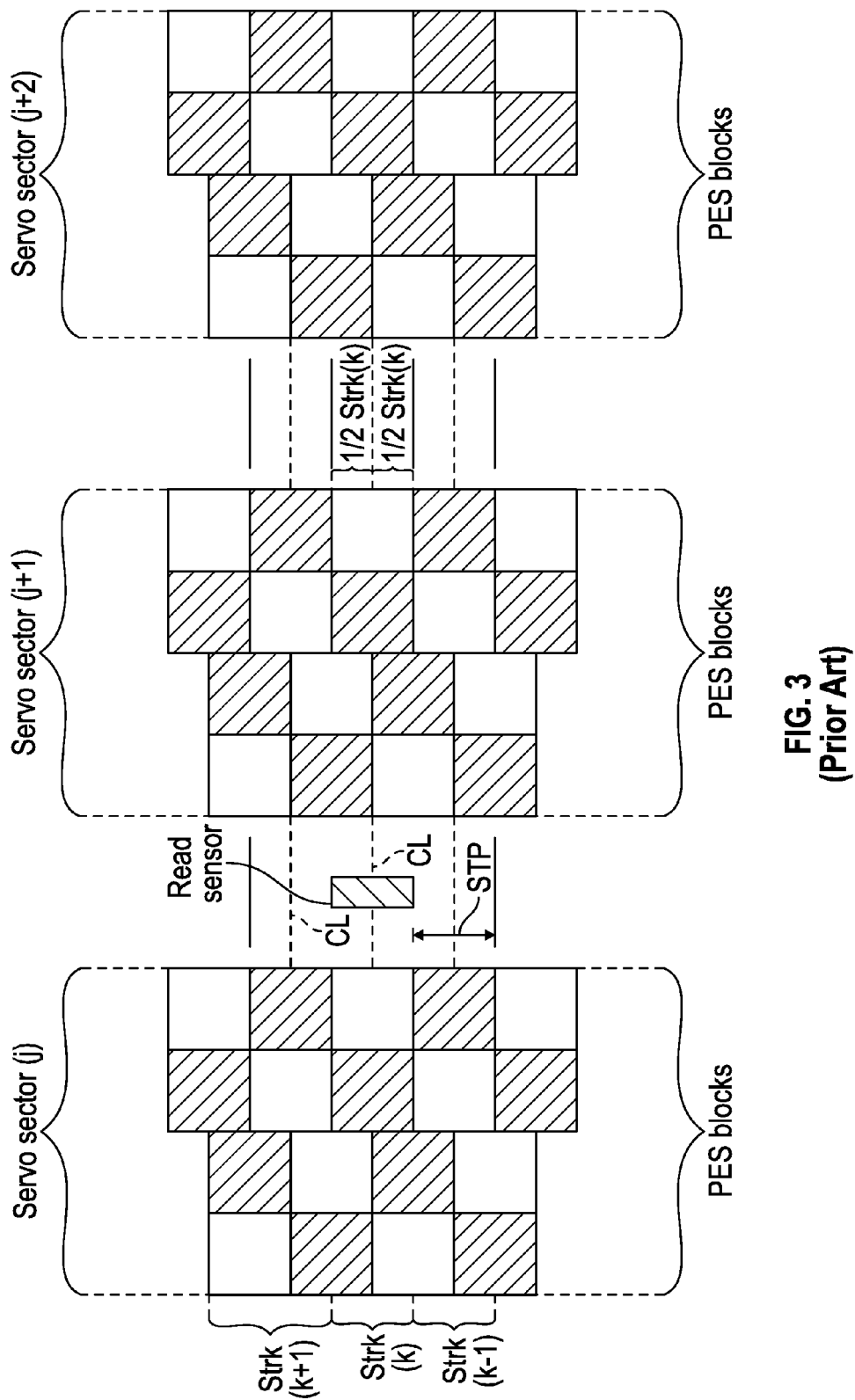
FIG. 3 is a view of a portion of three servo tracks with three angularly-spaced servo sectors that contain a pattern of PES blocks according to the prior art.

FIG. 3 is a view of a portion of three servo tracks (strk(k−1) through strk(k+1)) with three angularly-spaced servo sectors (servo sector(j) through servo sector (j+1)). The servo sectors contain a pattern of PES blocks that are detected by the read head and decoded to provide the PES. The PES blocks have a radial or cross-track width of one servo track but are in a pattern such they are shifted by one-half servo track. Each servo track has a centerline (CL) and includes two half tracks that together have a servo track pitch (STP). As shown by the read sensor located in strk(k) the read sensor detects the pattern of servo blocks in the two half tracks.

Figure 4:
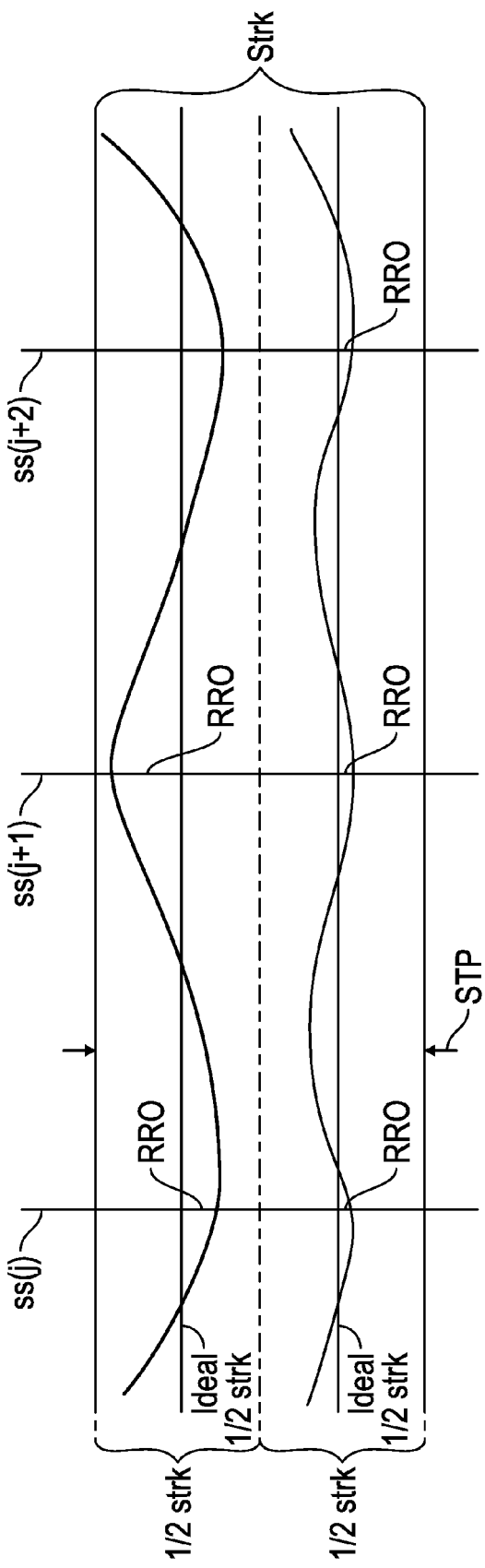
FIG. 4 is a schematic depicting a portion of two half-tracks of a servo track and shows the deviation of the half-tracks from a perfectly circular path at three servo sectors due to repeatable runout (RRO).

The PES blocks are written in half-track increments in the disk drive or by a dedicated servowriter during disk drive manufacturing. However, during the servowriting process, media noise, write head motion and mechanical disturbances cause a written-in track shape error for each half-track. Thus as a head attempts to follow a servo track it will not follow a perfect circular path. Instead, the head will deviate from the desired circular path due to the written-in track shape errors. This deviation from the desired path is referred to as "runout." Repeatable runout (RRO) refers to deviation that is non-random and occurs with some predictability for each servo track. FIG. 4 is a schematic depicting a portion of two half-tracks of a servo track (strk(k)) and shows the deviation of the half-tracks from a perfectly circular path at three servo sectors (SS(j), SS(j+1), SS(j+2)) due to RRO. The RRO occurs in each servo half-track and is not correlated with the RRO in other servo half-tracks. This results in track misregistration (TMR) during reading and writing.

Figure 5:
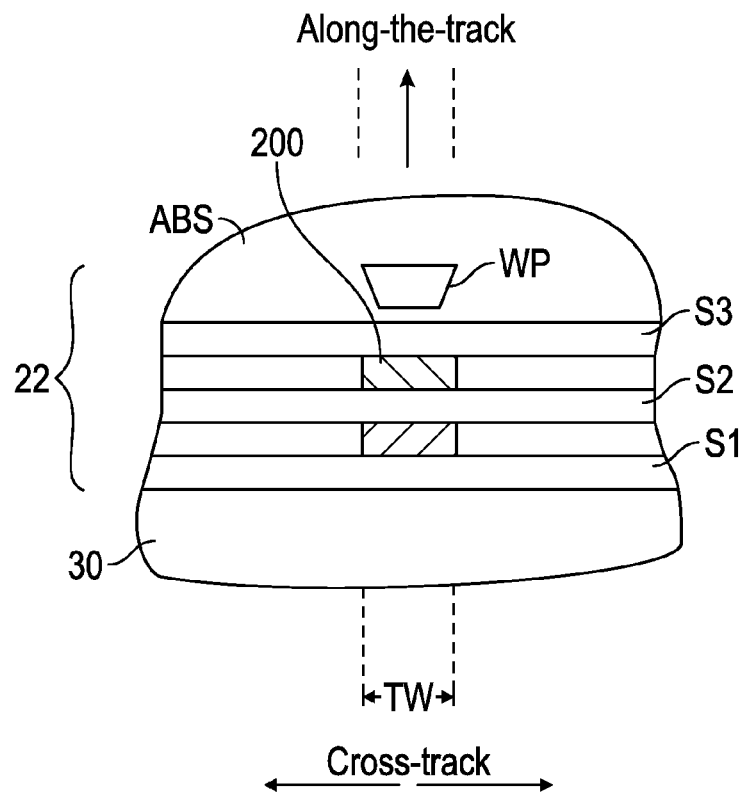
FIG. 5 is a view of the air-bearing surface (ABS) of a slider as viewed from the disk and shows the write pole (WP) and the stacked read sensors of a TDMR head structure according to the prior art.

In a TDMR HDD the read head portion of read/write head 22 (FIG. 1) is a sensor structure of stacked multiple read sensors. FIG. 5 is a view of the air-bearing surface (ABS) of slider 30 as viewed from the disk 24 and shows the write pole (WP) and the stacked read sensors 100, 200 of the read/write head 22 in one type of TDMR head structure. In this example both read sensors 100, 200 are aligned with one another, i.e., zero sensor-sensor cross-track offset (CTO), so as to read the same data track with trackwidth TW. Lower read sensor 100 is located between two magnetic shields, lower shield S1 and center shield S2. Upper read sensor 200 is also located between two magnetic shields, center shield S2 and upper shield S3. The shields S1, S2, S3 are formed of magnetically permeable material and may be electrically conductive so they can function as the electrical leads to the read sensors 100 and 200. The shields function is to shield the read sensors 100 and 200 from recorded data bits that neighbor the data bit being read. FIG. 5 is not to scale because of the difficulty in showing very small dimensions. Typically the lower and upper shields S1 and S3, respectively, may each be up to several microns thick in the along-the-track direction, as compared to the total thickness of each read sensor 100, 200 in the along-the-track direction, which may be in the range of about 20 to 40 nm.

Figure 6A:
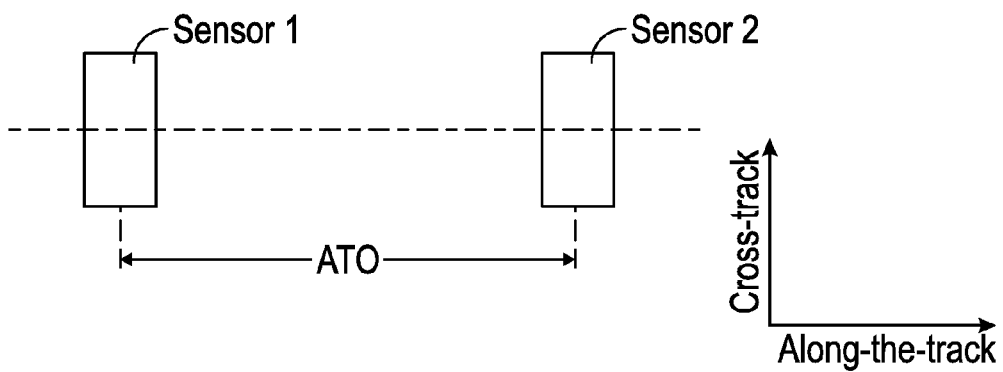
FIGS. 6A-6C are schematics depicting various TDMR read head structures.
Figure 6B:
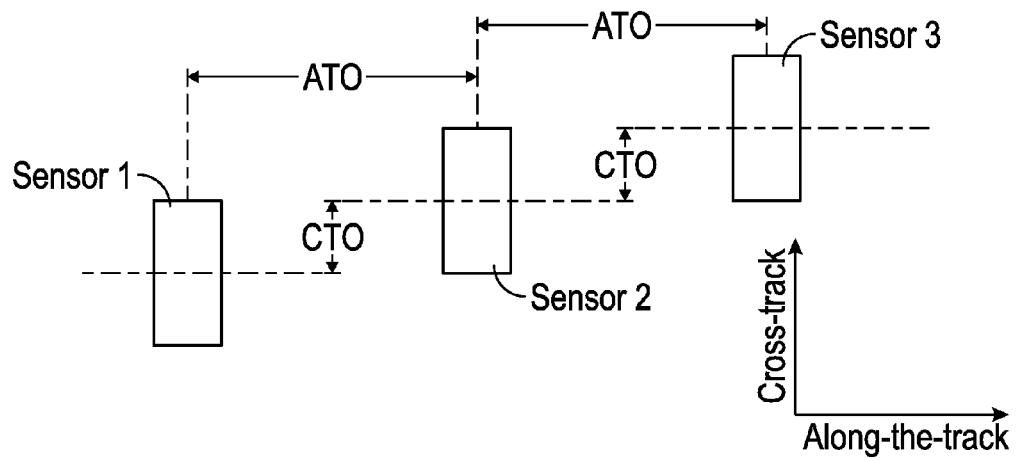
Figure 6C:
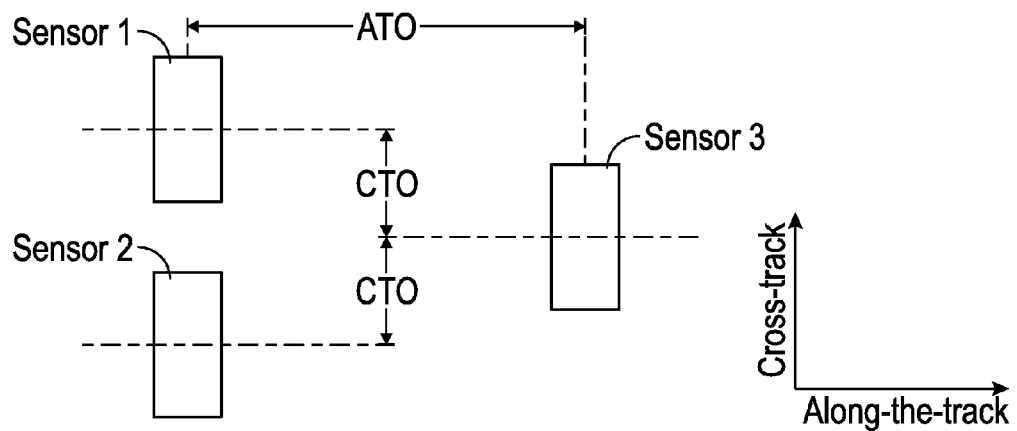

FIGS. 6A-6C depict various TDMR read head structures. FIG. 6A shows a two-sensor embodiment with a zero cross-track offset (CTO=0) and an along-the-track offset (ATO). FIG. 6B shows a three-sensor embodiment with a non-zero CTO and a non-zero ATO between all three sensors. FIG. 6C shows a three-sensor embodiment with a non-zero CTO between all three sensors and a zero ATO between two of the sensors in which those two sensors have a non-zero ATO with the third sensor.

A reduction in TMR in a TDMR disk drive depends on the number of servo half-tracks that are being read by the multiple sensors. If all of the sensors are reading different servo half-tracks the RRO of the different servo half-tracks will be averaged out and TMR will be reduced. The effect of head "skew" will cause an increase in sensor cross-track spacing (CTS) as a function of radius. Skew arises because the sensors are supported on a radial actuator that causes the sensors to make an arcuate path across the disk. This increase in CTS due to skew may result in the sensors reading different servo half-tracks at some radial positions. However, if the servo track pitch (STP) is fixed across the entire diameter of the disk, this effect will not be optimized.

Figure 7A:
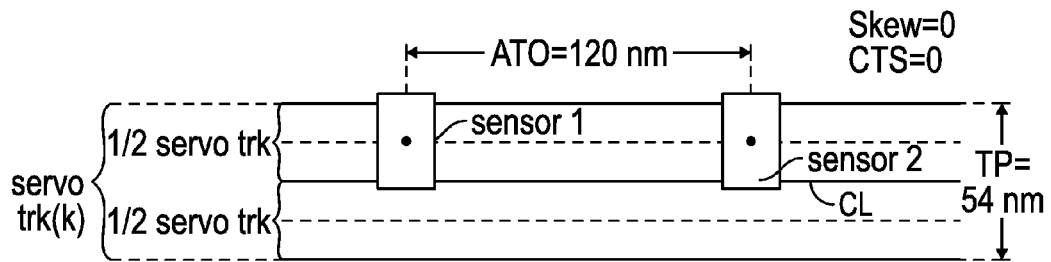
FIG. 7A is a schematic of a two-sensor TDMR read head structure at zero skew, i.e., on a servo track at the mid-diameter (MD) region of the disk with the servo track pitch (STP) being 54 nm.
Figure 7B:
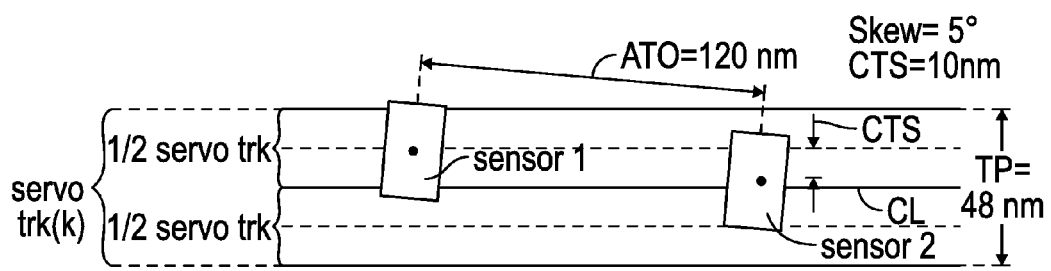
FIG. 7B is a schematic of the same head structure as in FIG. 7A but at a skew angle of θ=5 degrees with the STP being 48 nm.
Figure 7C:
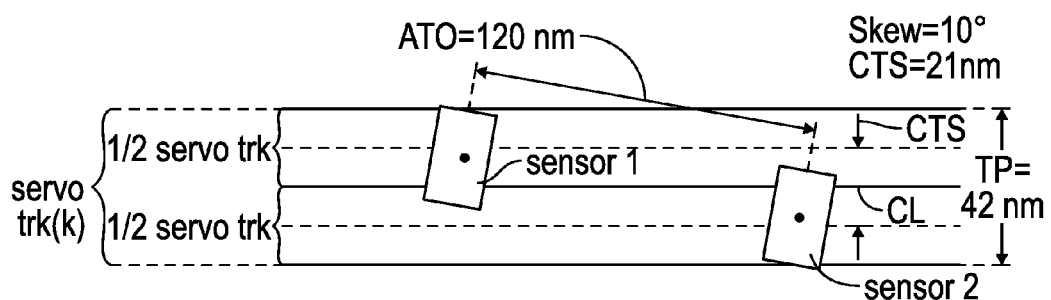
FIG. 7C is a schematic of the same head structure as in FIG. 7A but at a skew angle of θ=10 degrees with the STP being 42 nm.

In embodiments of this invention, the disk has a STP that is varied as a function of CTS (and thus radial position) to optimize the positions of the sensors with respect to the servo half-tracks across the disk. FIGS. 7A-7C are schematics of a two-sensor TDMR head structure with CTO=0 at various skew angles for illustrating how a variable STP results in each sensor being located on a different servo half-track. FIG. 7A is a schematic of a two-sensor TDMR read head structure at zero skew, i.e., on a servo track at the mid-diameter (MD) region of the disk. The skew angle is the angle between a normal to the sensors and the track centerline. As shown in FIG. 7A, at zero and small skew angles there is no benefit in TMR reduction because both sensors are reading the same servo half-track. FIG. 7B is a schematic of the same head structure at a skew angle of θ=5 degrees. The CTS is given by the following equation:

$$CTS=(CTO)\cos\theta+(ATO)\sin\theta \quad \text{Equation (1)}$$

The CTS is approximately 10 nm. The STP is reduced from 54 nm to 48 nm and results in sensor 2 being located with a substantial portion on the lower servo half-track. FIG. 7C is a schematic of the same head structure at a skew angle of θ=10 degrees. The CTS is approximately 21 nm. The STP is reduced from 54 nm to 42 nm and results in sensor 1 being located in the upper servo half-track and sensor 2 being located in the lower servo half-track.

The optimal STP for TMR reduction at each radial position, from just a geometrical aspect, depends on the head structure geometry (CTO and ATO), read sensor cross-track width, the skew angle and the STP at zero skew. The TMR reduction is due to the averaging effect of the multiple sensors. The averaging effect is a function of CTS (and thus skew). The multiple sensors can provide TMR reduction if they are reading totally uncorrelated noise sources. Since the noise sources are located at the servo half-track edges, if the STP is varied so that the sensors are located at the middle of the servo half-tracks, the maximum TMR reduction will be obtained.

Figure 8:
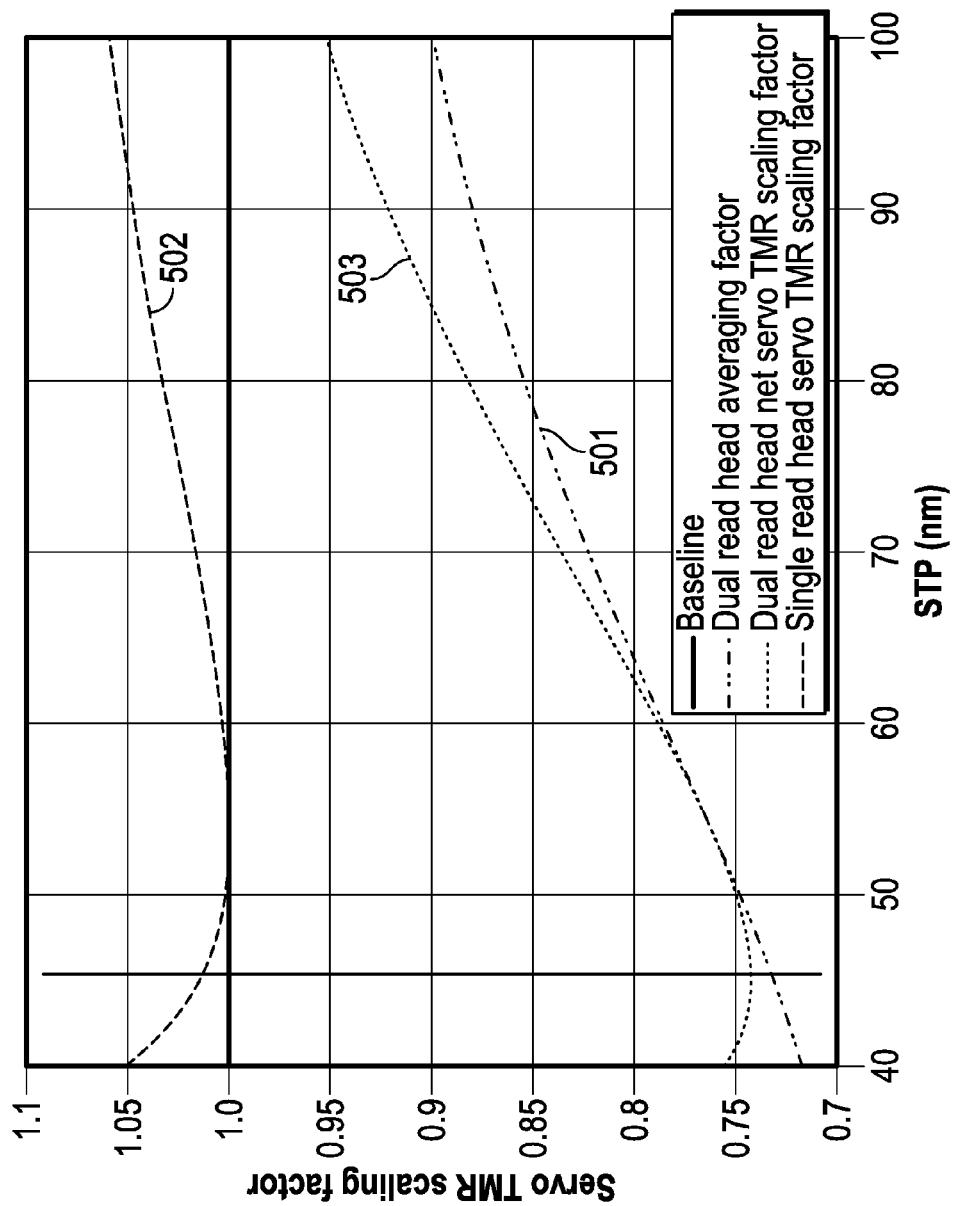
FIG. 8 is a graph of track misregistration (TMR) scaling factor (where 1.0 is the baseline TMR value) as a function of STP for illustrating how the effects of other non-geometric factors modify the dual-sensor averaging effect.

FIG. 8 is a graph of TMR scaling factor (where 1.0 is the baseline TMR value) as a function of STP for illustrating how the effects of other non-geometric factors modify the dual-sensor averaging effect. Line 501 is the TMR scaling factor based on just the geometric averaging effect from dual sensors for a skew angle of 15 degrees. The TMR scaling factor increases (meaning the amount of TMR reduction decreases) from about 0.72 at a STP of 40 nm to about 0.9 at a STP of 100 nm. Line 502 is the TMR scaling factor from simulation modeling for a single sensor with an optimal STP of 54 nm at zero skew (the TMR scaling factor is 1.0 at a STP of 54 nm). Line 502 does not represent any geometric effect but shows the effect of TMR on a single sensor from other factors, which include magnetic noise, erase band noise (the result of the write head erasing a portion of a servo sector in a track when writing a servo sector in an adjacent servo track) and the servo PES linearity. If the STP is decreased from 54 nm (the optimal STP), the TMR increases because of an increase in magnetic noise and erase noise. If the STP is increased from 54 nm, the TMR increases because of a decrease in signal and a decrease in PES linearity. Thus in embodiments of this invention the effects of these non-geometric factors shown by line 502 are considered together with the benefit of the averaging effects shown by line 501. The net effect is shown by line 503, which is the net TMR scaling factor. Thus in this example, for a dual-sensor TDMR head structure in a HDD with a STP of 54 nm at zero skew (near the MD of the disk), the optimal STP at a skew angle of 15 degrees (near the ID and OD of the disk) would be about 45 nm (the minimum of line 503).

Figure 9A:
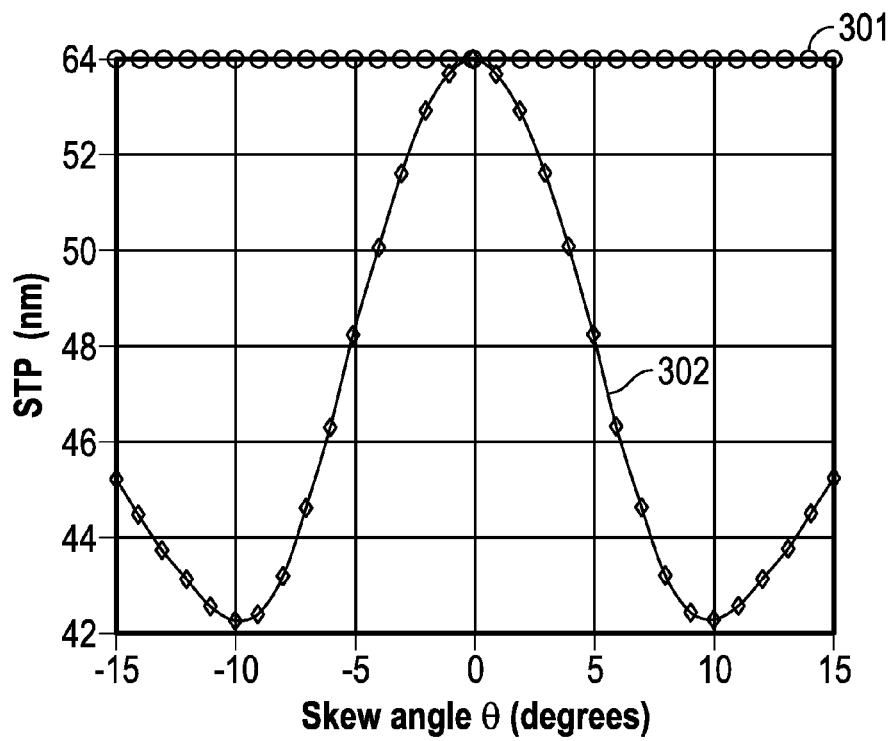
FIG. 9A is a graph from computer simulation comparing STP for a single sensor with a two-sensor TDMR head structure as a function of skew angle according to an embodiment of the invention.
Figure 9B:
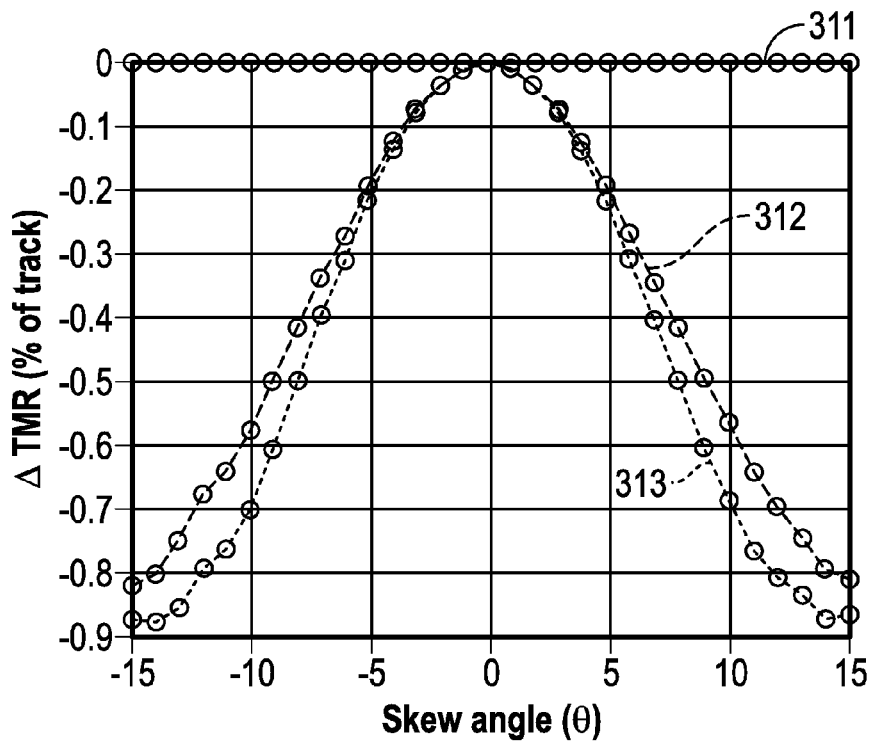
FIG. 9B is a graph from computer simulation comparing TMR reduction of a single-sensor head with fixed STP with the two-sensor structure of FIG. 6A with fixed STP and with variable STP according to an embodiment of the invention.

The non-geometric factors and the geometrical factors shown in FIG. 8 have been used in simulation modeling to arrive at the optimal STP as a function of radius for various TDMR head structures in embodiments of this invention. FIG. 9A is a graph from computer simulation comparing STP for a single sensor with a two-sensor TDMR head structure as a function of skew angle. Line 301 represents a fixed STP of 54 nm for a conventional single read sensor. Line 302 shows the optimal STP as a function of skew angle (and thus radial position) at 31 discrete skew angles for a two-sensor head structure with CTO=0, ATO=120 nm and sensor cross-track width of 34 nm. At zero skew angle the STP is 54 nm. FIG. 9A shows that the optimal variable STP profile across the disk is a continuous reduction in STP from the STP at zero skew angle (54 nm) to skew angles of +/−10 degrees where the STP is about 42 nm. At these skew angles, the CTS is about STP/2 or about 21 nm. However, at skew angles from 10 to 15 degrees a further reduction in STP would actually make the TMR worse because the dominant effects on TMR are due to the non-geometric effects. So the optimal variable STP profile across the radial positions of the disk between skew angles of 10 and 15 degrees is a gradual increase from about 42 nm to about 45 nm. FIG. 9B is a graph from computer simulation comparing TMR reduction of a single-sensor head with fixed STP (line 311) with the two-sensor structure of FIG. 6A with a fixed STP (line 312) and with a variable STP according to embodiments of the invention (line 313). A comparison of line 313 with line 312 shows a reduction in TMR most noticeably at skew angles greater than about 5 degrees.

Figure 10A:
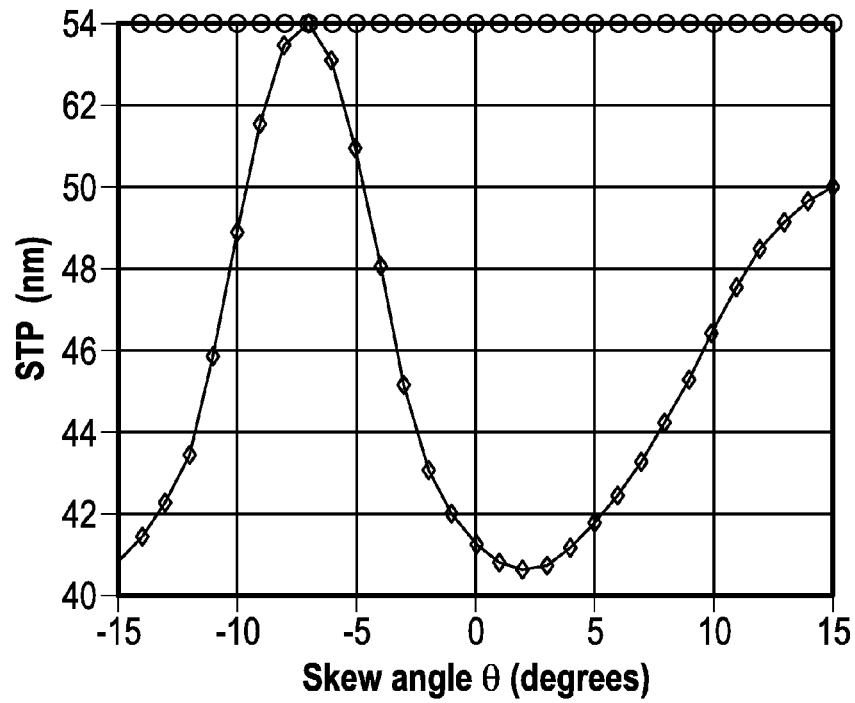
FIG. 10A is a graph from computer simulation comparing STP for a single sensor with a three-sensor TDMR head structure like that shown in FIG. 6B as a function of skew angle according to an embodiment of the invention.
Figure 10B:
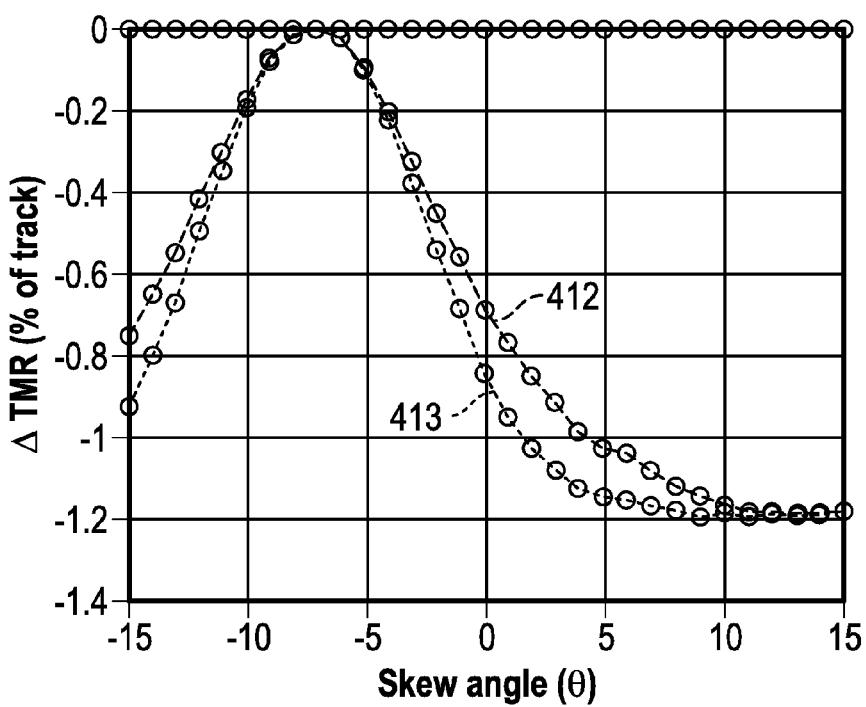
FIG. 10B is a graph from computer simulation comparing TMR reduction of a single-sensor head with fixed STP with the three-sensor structure of FIG. 6B with fixed STP and with variable STP according to an embodiment of the invention.

FIGS. 10A and 10B are similar graphs as FIGS. 9A-9B, but for a three-sensor structure like that shown in FIG. 6B, with CTO=15 nm, ATO=120 nm and sensor cross-track width of 34 nm. Line 413 in FIG. 10B shows the improvement in TMR reduction with a variable STP as compared with line 412, which is for the same three-sensor structure with a fixed STP. The improvement is most noticeable at skew angles greater (more negative) than about −10 degrees, and at skew angles between about −2 degrees to about +10 degrees.

Figure 11:
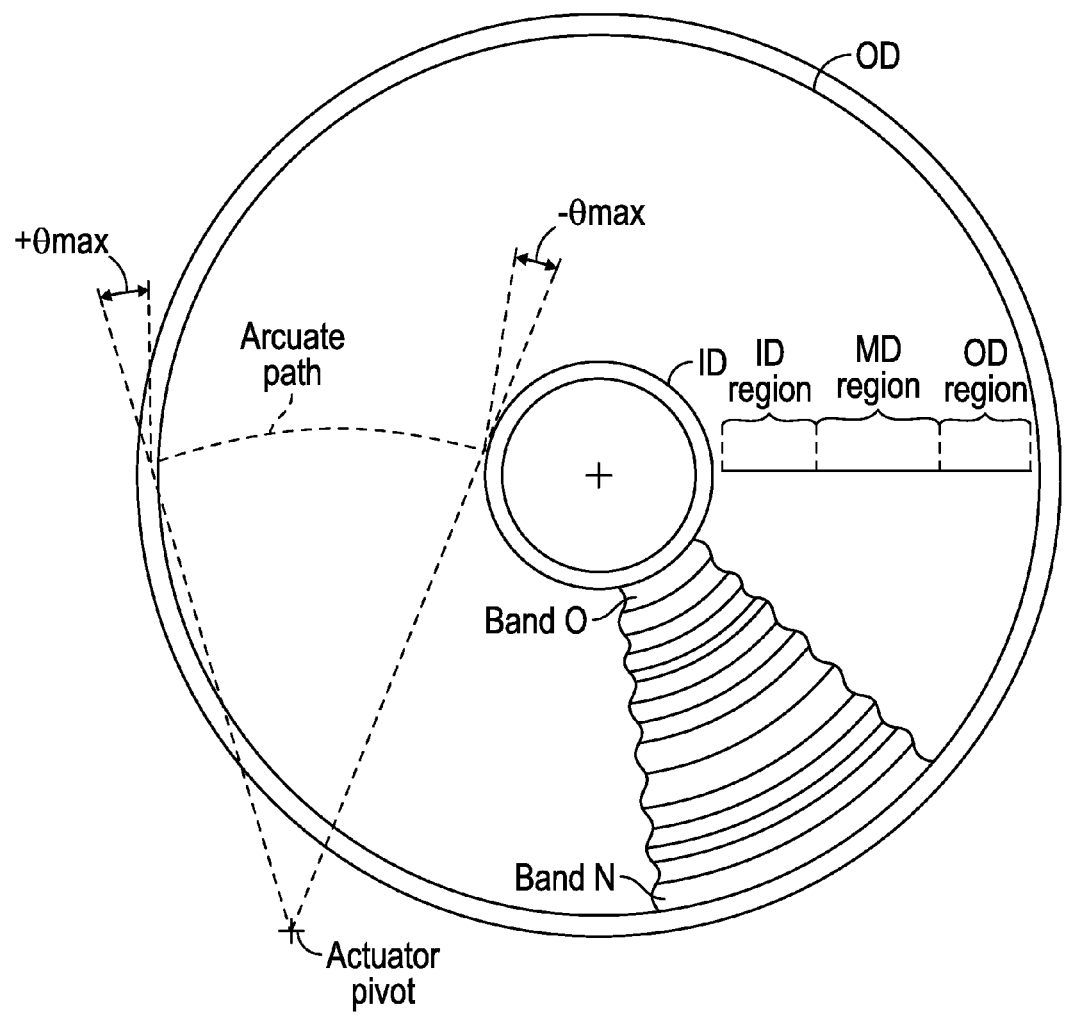
FIG. 11 is a schematic of a disk showing a portion of a number of annular bands, with each band having a unique STP, according to an embodiment of the invention.

In one implementation of an embodiment of the invention, the servo tracks are arranged into a plurality of annular bands, and the STP in each band is fixed and different from the STP in the other bands. FIG. 11 is a schematic of a disk with a data region between the disk inside diameter (ID) and outside diameter (OD) showing three general regions, the ID region, the mid-diameter (MD) region, and the OD region. FIG. 11 also shows the arcuate path of the read sensors that results in a skew angle θ that varies from ID to OD, with zero skew angle being in the MD region and the maximum skew angle ($\theta_{max}$) being at the ID and OD. A portion of a number of bands, from 0 to N, is depicted, with each band having a unique STP. The number of bands, the radial length of each band and the fixed STP for each band can be selected from the curves of STP vs. skew angle generated for the specific head structure, such as FIG. 9A and FIG. 10A.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A two-dimensional magnetic recording (TDMR) disk drive comprising:
   a magnetic recording disk comprising
      a substrate;
      a recording layer on the substrate;
      a plurality of radially spaced servo tracks on the recording layer and having a plurality of angularly spaced servo sectors extending across the servo tracks, the servo tracks having different track pitches at different radial positions;

a sensor carrier supporting at least two read sensors, the read sensors supported on the carrier with a cross-track offset (CTO) and an along-the-track offset (ATO); and a rotary actuator connected to the carrier for moving the read sensors radially, whereby the read sensors make a skew angle $\theta$ with the tracks that varies with radial position.

2. The disk drive of claim 1 wherein there are two and only two read heads and wherein CTO is zero.

3. The disk drive of claim 1 wherein there are two and only two read heads and wherein CTO is non-zero.

4. The disk drive of claim 1 wherein there are three and only three read heads and wherein CTO between each of the read heads is non-zero.

5. The disk drive of claim 4 wherein there are three and only three read heads and wherein the ATO between two of the read heads is zero.

6. The disk drive of claim 1 wherein the servo track pitch is related to the skew angle.

7. The disk drive of claim 6 wherein the servo track pitch is related to the sensor-to-sensor cross-track spacing (CTS), wherein CTS is represented by the relationship $CTS=(CTO)\cos\theta+(ATO)\sin\theta$.

8. The disk drive of claim 1 wherein the servo tracks are arranged into a plurality of annular bands, wherein the servo track pitch in each band is fixed and different from the servo track pitch in the other bands.

9. The disk drive of claim 1 wherein the disk drive is a shingled magnetic recording disk drive.

10. A two-dimensional magnetic recording (TDMR) disk drive comprising:

a magnetic recording disk comprising
  a substrate;
  a recording layer on the substrate;
  a plurality of radially spaced servo tracks on the recording layer and having a plurality of angularly spaced servo sectors extending across the servo tracks, the servo tracks arranged into a plurality of annular bands, each band in said plurality of bands having a unique servo track pitch (STP);

a sensor carrier supporting at least two read sensors, the read sensors supported on the carrier with a cross-track offset (CTO) and an along-the-track offset (ATO); and a rotary actuator connected to the carrier for moving the read sensors in an arcuate path across the disk, whereby the read sensors make a skew angle $\theta$ with the servo tracks that varies with radial position; and wherein the STP in each band of said plurality of bands is related to the sensor-to-sensor cross-track spacing (CTS) and wherein CTS is represented by the relationship $CTS=(CTO)\cos\theta+(ATO)\sin\theta$.

11. The disk drive of claim 10 wherein there are two and only two read heads and wherein CTO is zero.

12. The disk drive of claim 10 wherein there are two and only two read heads and wherein CTO is non-zero.

13. The disk drive of claim 10 wherein there are three and only three read heads and wherein CTO between each of the read heads is non-zero.

14. The disk drive of claim 13 wherein there are three and only three read heads and wherein the ATO between two of the read heads is zero.

15. The disk drive of claim 10 wherein the disk drive is a shingled magnetic recording disk drive.

\* \* \* \* \*